J. WOLTER.
APPARATUS FOR CUTTING BINDING THREADS.
APPLICATION FILED FEB. 3, 1914.
1,133,777.
Patented Mar. 30, 1915.
4 SHEETS—SHEET 1.
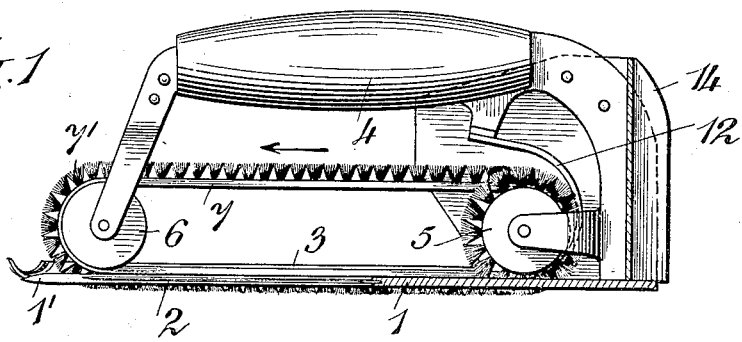
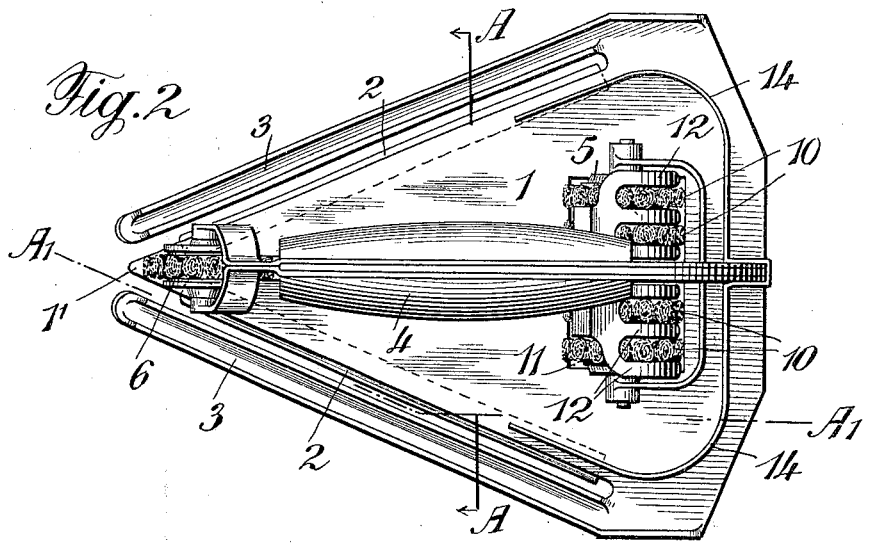
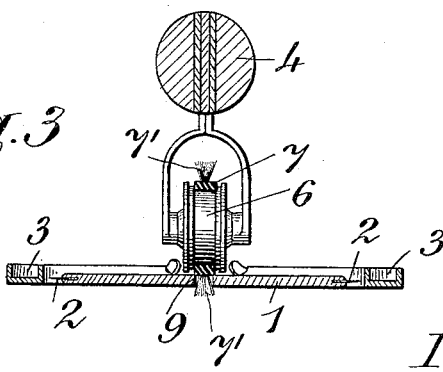
Witnesses:
Charles B Crompton
May G. Luttrell
Inventor:
J. Wolter.
By Croydon Marks
Attorney.

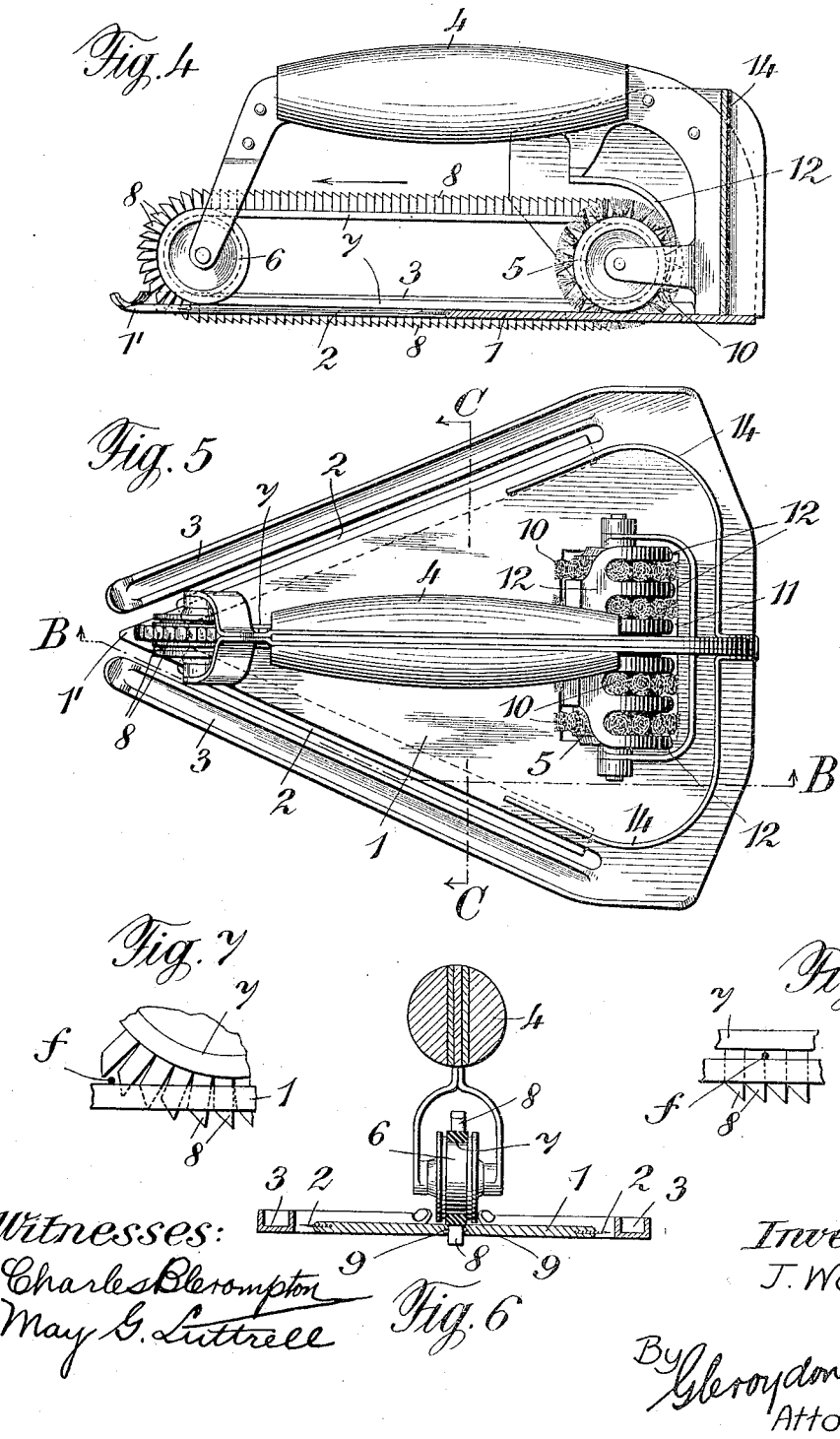

J. WOLTER.
APPARATUS FOR CUTTING BINDING THREADS.
APPLICATION FILED FEB. 3, 1914.
1,133,777.
Patented Mar. 30, 1915.
4 SHEETS—SHEET 3.
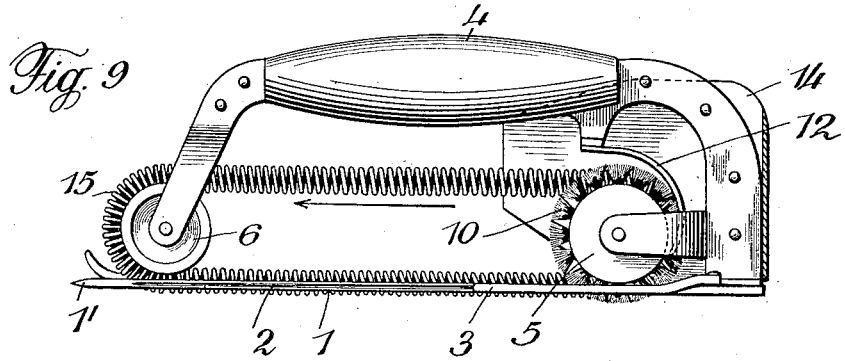
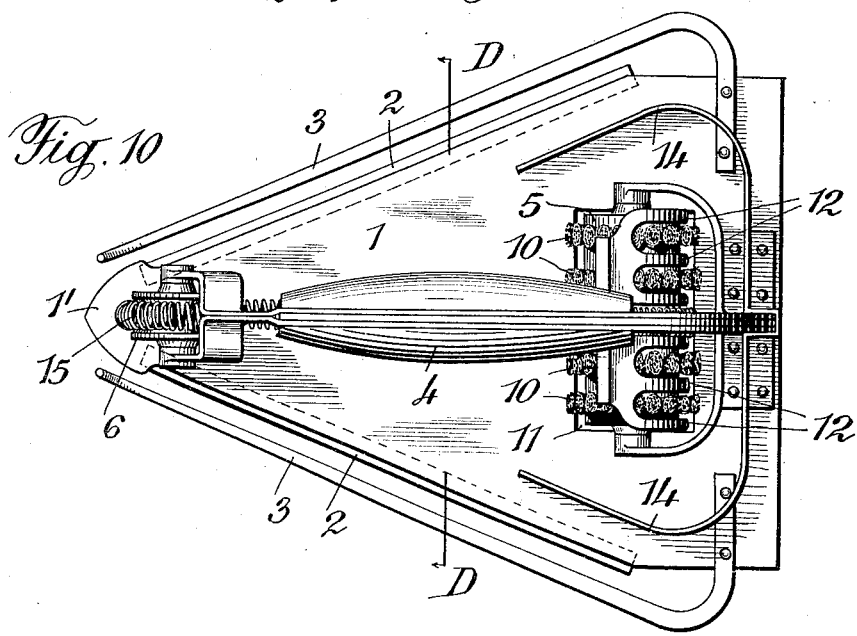
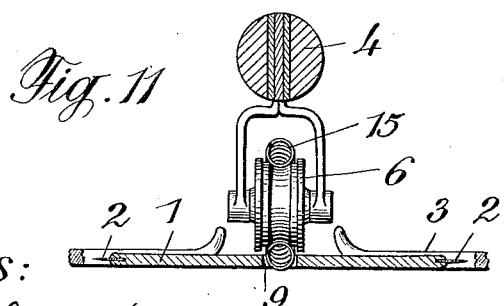
Witnesses:
Charles B. Crompton
May G. Luttrell
Inventor:
J. Wolter.
By G. Croydon Marks
Attorney.

J. WOLTER.
APPARATUS FOR CUTTING BINDING THREADS.
APPLICATION FILED FEB. 3, 1914.
1,133,777.
Patented Mar. 30, 1915.
4 SHEETS—SHEET 4.
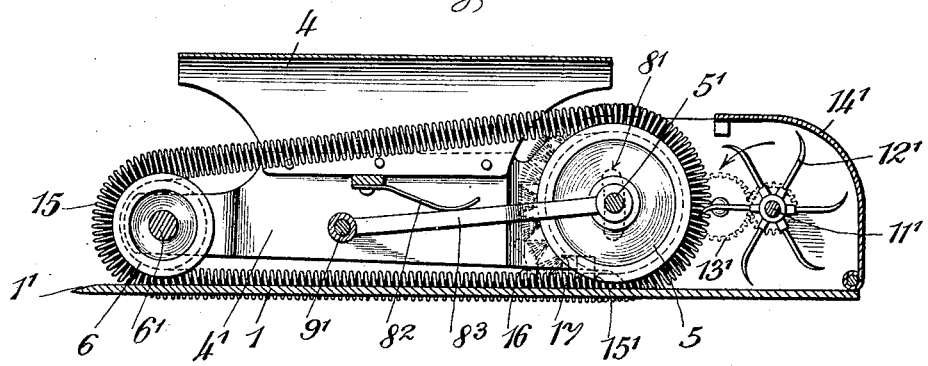
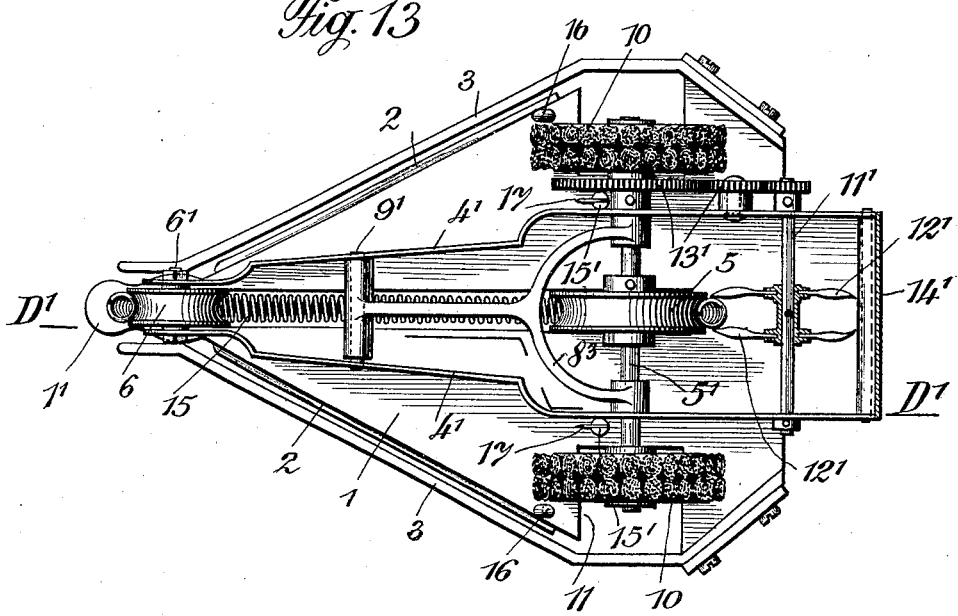
Witnesses:
Charles B Crompton
May G. Luttrell
Inventor:
J. Wolter.
By Croydon Marks
Attorney.

UNITED STATES PATENT OFFICE.

JOSEF WOLTER, OF RORSCHACH, SWITZERLAND, ASSIGNOR TO HENRY LEVY, OF RORSCHACH, SWITZERLAND.

APPARATUS FOR CUTTING BINDING-THREADS.

1,133,777.

Specification of Letters Patent.

Patented Mar. 30, 1915.

Application filed February 3, 1914. Serial No. 816,222.

*To all whom it may concern:*

Be it known that I, JOSEF WOLTER, a subject of the Queen of the Netherlands, residing at Rorschach, Switzerland, have invented certain new and useful Improvements in Apparatus for Cutting Binding-Threads; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The hitherto known apparatus for cutting the binding-threads of embroidered fabrics consist usually of two knives converging toward the front end of the apparatus and of an endless flexible member arranged between the knives, said member catching and holding the threads fast while they are cut and being moved backward relatively to the apparatus while the latter is guided over the fabric. In these known apparatus the seized threads, which have to be cut, are drawn by means of the endless member into a slot of a thread-catcher for the purpose of being tensioned and drawn toward the cutting knives. The threads may, however, also be held fast relatively to the apparatus by means of the endless band pressing them against the fabric. These apparatus are therefore only adapted for cutting the binding-threads of embroidered fabrics, which have been taken off the machine and which are spread over a table, the table forming then the fixed support for the fabric or endless band respectively. When these known apparatus are used the binding threads are not tensioned but are in a more or less loose condition, so that they may sustain a tensioning by the cutting apparatus. These apparatus are, however, not adapted to be used for cutting the binding-threads of an embroidered fabric, which is still stretched in the embroidering machine, because in this case there is provided no fixed support for the fabric and the endless band, respectively. Moreover the binding threads are tensioned and they may easily break while they are drawn into the slot of the catching-plate, so that a further treatment of the fabric on the warping machine is necessary.

The object of the present invention is now to provide an apparatus for cutting binding-threads of the hereinbefore described type, in which the flexible member consists of a plurality of clamps, which are arranged side by side and which are open at the front turning point of the flexible member operated as soon as the apparatus is moved over the fabric. These clamps seize in their open condition the threads caught by the catching plate. In this manner the threads are held fast by the clamps during the cutting operation, the cut threads being then released as soon as the clamps reach their rear turning point, at which point said clamps are again opened. Owing to this arrangement all the hereinbefore mentioned drawbacks of the hitherto known devices are eliminated.

Further, the invention relates to a device to be provided on such a cutting apparatus, which permit to strip off all the binding threads from the clamps, so that the apparatus is still in a good working condition after having been used for some time.

According to the present invention this device consists of a positively driven stripping-off wheel having a plurality of arms acting as stripping off members. The endless member passes near its rearward turning point between these arms, which draw then the binding-threads out of the opened clamps.

Several forms of carrying the invention into effect are shown by way of example in the accompanying drawings, in which:

Figure 1 shows a front elevation partly in section on line A'—A', of Fig. 2 of a first construction, Fig. 2 shows a plan view of Fig. 1 and Fig. 3 a section on the line A—A of Fig. 2; Fig. 4 shows a front elevation partly in section on the line B—B of Fig. 5 of a second construction, Fig. 5 shows a plan view of Fig. 4, and Fig. 6 a section on the line C—C of Fig. 5, Figs. 7 and 8 show on an enlarged scale some of the clamps in different working positions, Fig. 9 shows a front elevation of a third construction, Fig. 10 shows a plan view of Fig. 9 and Fig. 11 a section on the line D—D of Fig. 10, Fig. 12 shows a section of a fourth construction on the line D—D of Fig. 13 and Fig. 13 shows a plan view, partly in section of Fig. 12.

In carrying out the apparatus according to the mode illustrated in Figs. 1–3 the base or catching plate 1 is provided on its two sides converging toward the front end into a catching point 1' with knives 2 and rails 3; the latter are arranged opposite said knives and serve to keep down the fabric. To the plate 1 there is fixed a stirrup-like handle 4 having bifurcated arms, which carry conveying rollers 5 and 6. Around these rollers 5 and 6 there passes an endless flexible band or strip 7 arranged in the longitudinal direction of the plate 1 and having on its circumference a plurality of bristle-tufts 7. These tufts are arranged side by side and the bristles of each tuft form clamps between them. The roller 5 has a groove acting as a guide for the band 7. On both sides of this groove of the roller 5 there are further provided two rows of bristle-tufts 10, which are kept on the same level as those of the bristle-band 7 and which project into an opening 11 provided in the plate 1. The bristles 10 assist the movement of the band 7 and they serve in particular to feed the cut off threads toward a rake 12, which is fixed to the handle 4 and whose teeth project into the bristle-tufts 10. The base plate 1 has a slot 9 extending in the longitudinal direction of the latter. The bristle-tufts 7' of the lower half of the band 7 project into this slot 9 (Fig. 3). 14 denotes a collecting box for the cut off binding threads detachably secured to the frame carrying the endless member.

The hereinbefore described apparatus works as follows: If there have to be cut binding-threads of an embroidered fabric the apparatus is put upon the fabric, so that the latter and the plate 1 are then brought in contact one with another. Hereupon the apparatus is moved along the fabric, the point 1' being continually in front. The roller 5, which with its bristles 10 touches the fabric, is hereby rotated and transmits its motion to the band 7, so that the latter is then rotated in the direction of the arrow indicated in Fig. 1. The binding threads are seized by the point 1' of the catching plate 1 and are brought within reach of the bristle-tufts 7' of the band 7. The bristles of the tufts 7' lying normally side by side are opened on the front turning point of the band, i. e. at the point where the latter passes round the roller 6, and they seize the binding thread or the binding-threads coming within their reach, and as these bristles are again closed as soon as they run off the roller 6 they hold the threads fast between them during the cutting operation. In this manner it is possible to cut the threads by means of the knives 2 near their ends. The threads seized by the bristle-tufts 7' are released at the rear turning point, i. e. at the point where the band 7 passes round the roller 5, the tufts 7' being then again opened. At the same time the released threads are seized by the bristle-tufts 10 of the roller 5, the rake 12 stripping them off the bristles 10, so that they can fall into the collecting box 14.

The hereinbefore described and illustrated apparatus is in particular adapted for cutting the binding-threads of embroidered fabrics, which are still stretched or tensioned in the embroidering machine. Instead of providing only one band 7 having only one row of bristle-tufts 7' there may as well be provided two or more of such bands arranged side by side, or there may be provided only one band having several rows of adjacent bristle-tufts. In this case the bristle-tufts of one row can be thinner and shorter than those of the other rows. In the three further constructions of such apparatus for cutting binding-threads illustrated in Figs. 4–8, Figs. 9–11 and Figs. 12–13 the same reference letters are used to denote parts corresponding to those of the apparatus shown in Figs. 1–3. In the following description the common features of these apparatus are not further described, only the new and distinguishing features of the different constructions being explained.

According to the construction illustrated in Figs. 4–8 the endless, flexible member consists of an elastic material, for instance, of a band 7 of india-rubber. This band passes over two rollers 5 and 6 and it is provided on its circumference with a plurality of flaps 8 forming a whole with the band 7 and arranged side by side, so that they form clamps between them. These flaps are beveled on their free end and they taper into an edge lying at a right angle to the direction of movement of the band 7. The clamps 8 are opened at the front turning point of the band 7, i. e. at the point where the band 7 runs on the front roller 6; at this point said clamps seize the binding-threads f (Fig. 7) caught by the plate 1 and brought within their reach. Since the clamps 8 are again closed as soon as they run off the roller 6 they hold said threads fast between them and the threads are then cut near their ends by the two knives 2. The cut threads are conveyed forward by the clamps 8 in the same manner as in the hereinbefore described apparatus, till they fall into the receptacle 14, these threads being released as soon as the band 7 runs on the rear roller 5, since the clamps 8 are then again opened. The fact that the clamps 8 are tapering at their free ends into an edge has the effect to push each binding thread seized by the plate 1 in a secure manner between two such clamps, the threads sliding easily along the inclined ends of the clamps.

According to the construction shown in Figs. 9–11 the endless, flexible member passing over the rollers 5 and 6 consists of a closed helical spring 15, whose single windings arranged side by side form clamps between them capable of holding fast the binding-threads. Also in this construction the clamps of the helical spring are opened on the front turning point of the latter in order to seize the binding threads. On the other hand these clamps are closed when they run off the roller 6 to be opened again at the rear turning point, when the cut threads have to be released. Also in the construction according to Figs. 4-8 there may be provided several bands 7 having flaps 8, or there may be provided only one of such a band having several rows of adjacent flaps 8. Similarly there may be provided in the construction according to Figs. 9-11 several helical springs arranged side by side.

Figs. 12 and 13 illustrate a construction substantially similar to that shown in Figs. 9-11. This apparatus has, however, an additional device, which strips all the binding threads off the clamps, so that the apparatus is still in a good working condition after having been used some time. According to this construction the stirrup-like handle 4 is connected to the walls $4^1$ connected to the plate 1. The front roller 6 is loosely and pivotally mounted on a horizontal axle $6^1$ supported in the walls $4^1$. The rear roller 5 is fixed to an axle $5^1$ pivotally supported in a bifurcated lever $8^3$ and capable of being moved in slots $8^1$ (Fig. 12) of the walls $4^1$. The bifurcated lever $8^3$ is pivotally mounted on a horizontal axle $9^1$ supported in the walls $4^1$ and it is acted upon by a pressure spring $8^2$. Behind the guide-roller 5 there is arranged an axle $11^1$ also pivotally supported in the walls $4^1$. To this axle $11^1$ there is fixed a reel provided with two rows of arms $12^1$. The ends of these arms acting as stripping-off fingers are pointed and, as shown, they are slightly turned off. These points inclose from both sides the spring 15 at its rear turning point (Fig. 13). The axle $11^1$ and therefore also the reel $12^1$, receive their turning movement from the axle $5^1$ of the guide-roller 5 by means of the toothed wheels $13^1$. The ratio of the latter is such, that the reel rotates with greater velocity than the guide-roller 5. The reel is arranged inside a receptacle formed by the plate 1, the side-walls $4^1$ and the movable cover $14^1$ and it is open at its front end.

When the hereinbefore described apparatus is used, the arms 12 of the reel rotating with a high velocity seize with their turned off fingers the loose binding threads and they draw them out of the clamps of the spring 15. After the cover $14^1$ has been removed the binding threads collected in the receptacle may be easily taken out and the threads hanging on the reel may easily be removed from the latter. The hereinbefore described device permits to disconnect each single binding-thread in a secure manner from the endless member 15. As soon as the apparatus is put upon the embroidered fabric the axle $5^1$ is moved upward against the action of the spring $8^2$ acting upon the lever $8^3$ till the lowermost part on the circumference of the bristle-rollers 10 comes to lie in the same plane as the lower side of the plate 1. The roller 10, and therefore also the axle $5^1$ with the guide-roller 5 and the spring 15, are rotated owing to the friction produced by the pressure of the spring $8^2$. In the construction according to Figs. 1-11 the plate 1 is inclined relatively to the fabric, i. e. its rear end is higher than the front one, because the rear guide-roller mounted upon a fixed axle projects beyond the lower surface of the plate 1. Owing to this position of the plate 1 the longer binding-threads are not cut in such a short manner as those which have been cut nearer to the front end of the plate 1. The arrangement shown in Figs. 12-13 eliminates now this drawback owing to the resilient supporting arrangement of the rear rollers 5 and 10, so that all binding-threads coming within reach of the plate 1 are cut everywhere in a short manner. The apparatus illustrated in Figs. 12-13 permits to eliminate a further drawback arising when apparatus of the kind illustrated in Figs. 1-11 are used.

If there are to be found on the stretched embroidered fabric long threads fastened only at one point as it is the case when newly threaded threads break these threads are well seized by the clamps of the endless members, which hold them fast. But as these threads are not stretched they are not cut by the knives. Such threads are then either caught by the walls of the collecting box or they entangle with the bristles of the rear guide-roller, so that the endless clamping member is prevented from moving forward till these threads are loosened by hand. To eliminate this drawback there are provided inside and outside the rollers 10 and on both sides of the endless spring 15 respectively, two pins $15^1$ and 16 fixed to the plate 1. The upper end of the outer pins 16 is bent forward and the inner pins $15^1$ are provided with vertical cutting edges 17 directed toward the front end of the apparatus. The pins 16 prevent loose threads of the hereinbefore mentioned type from coming within reach of the bristle-rollers and the toothed wheels $13^1$, while the cutting edges sever these threads till the fastening point of them comes finally within reach of one of the knives 2, when the threads are then cut near the fabric.

The hereinbefore described and illustrated apparatus for cutting binding threads have the advantage compared with the hitherto known apparatus of this kind that the binding-threads seized by the clamps are held fast in such a manner that they are prevented from being shifted while they are cut by means of the knives 2, so that they may be cut in a secure manner on both ends. Owing to this particularity and their construction, the apparatus according to this invention are particularly adapted for cutting the binding-threads of embroidered fabrics stretched or tensioned in the embroidering machines.

What I claim is:

1. In an apparatus for cutting binding-threads of embroidered fabrics the combination with a catching-plate of two knives provided on the plate and converging toward the front end of the apparatus, guide-rollers carried by said plate and an endless flexible member arranged between the knives and passing over said rollers and consisting of a plurality of clamps for seizing and holding fast the threads to be cut, means for driving the endless flexible member, said clamps being opened when the endless band runs on the rollers and being again closed when said band runs off the rollers.

2. In an apparatus for cutting binding-threads of embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers and rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads.

3. In an apparatus for cutting binding-threads of embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers, rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads and means for stripping the binding-threads off the rear guide-roller.

4. In an apparatus for cutting binding-threads for embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers, rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads, means for stripping the binding-threads off the rear guide roller and at least one collecting box for the cut off thread detachably secured to the frame carrying the endless member.

5. In an apparatus for cutting binding-threads of embroidered fabrics the combination with a catching-plate having a longitudinal slot of two knives provided on this plate and converging toward the front end of the apparatus, two guide-rollers carried by said plate, a closed helical spring arranged between the knives and passing over said rollers, the single windings of this spring arranged side by side forming clamps between them and of rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads.

6. In an apparatus for cutting binding-threads of embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers, rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads and a driven stripping off wheel provided with arms encircling the endless flexible member at its rear turning point to pull the binding threads out of the open clamps.

7. In an apparatus for cutting binding-threads of embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers, rows of bristles arranged on both sides of the rear guide-roller and connected to the latter, the bristles projecting into the slot of said plate and serving to rotate the rear guide-roller while the apparatus is moved over the fabric and serving also to seize the cut off binding-threads and a reel provided with two rows of arms having turned off ends encircling the endless member at its rear turning point, the reel being also operatively connected to the rear guide-roller.

8. In an apparatus for cutting binding-threads of embroidered fabrics the combination with a catching plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said bands runs off the rollers, rows of bristles arranged on the same rotatable axle as the rear guide-roller and on both sides of the latter, and projecting into the slot of the catching-plate, a lever carrying said axle, a spring acting upon this lever and a reel provided with two rows of arms having turned off ends encircling the endless member at its rear turning point, said reel being also operatively connected to the rear guide-roller.

9. In an apparatus for cutting binding-threads of embroidered fabrics the combination with a catching-plate having a longitudinal slot of two knives provided on this plate and converging toward the front end of the apparatus, two guide-rollers carried by said plate, an endless flexible member arranged between the knives and passing over said rollers and consisting of a plurality of clamps for seizing and holding fast the threads to be cut, said clamps being opened when the endless band runs on the rollers and being again closed when said band runs off the rollers, rows of bristles arranged on the same rotatable axle as the rear guide-roller and on both sides of the latter, and projecting into the slot of the catching-plate, a lever carrying said axle, a spring acting upon this lever, a reel provided with two rows of arms having turned off ends encircling the endless member at its rear turning point, said reel being also operatively connected to the rear guide-roller and fixed pins arranged in front of the rows of bristles and on both sides of the endless member, the pins in front of the bristles serving to keep back the threads and those on the sides of the endless member having vertical edges for cutting the seized threads.

In testimony that I claim the foregoing as my invention, I have signed my name in presence of two subscribing witnesses.

JOSEF WOLTER.

Witnesses:
 FRANK TRUMKE,
 RANDALL ATKINSON.